US009858105B1

(12) United States Patent
Upadhyay et al.

(10) Patent No.: US 9,858,105 B1
(45) Date of Patent: Jan. 2, 2018

(54) SERVICE FOR MANAGING CUSTOM VIRTUAL MACHINE IMAGES

(71) Applicant: Amazon Technologies, Inc., Seattle, WA (US)

(72) Inventors: Divyang Mahendrabhai Upadhyay, Bellevue, WA (US); Sivaprasad Venkata Padisetty, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 45 days.

(21) Appl. No.: 14/951,000

(22) Filed: Nov. 24, 2015

(51) Int. Cl.
G06F 9/455 (2006.01)
G06F 9/445 (2006.01)

(52) U.S. Cl.
CPC ............ G06F 9/45558 (2013.01); G06F 8/63 (2013.01); G06F 2009/45562 (2013.01); G06F 2009/45595 (2013.01)

(58) Field of Classification Search
CPC .................................................. G06F 9/45558
See application file for complete search history.

(56) References Cited

U.S. PATENT DOCUMENTS

| 8,713,556 | B2* | 4/2014 | Bozak ....................... G06F 8/65 717/170 |
| 2010/0306764 | A1* | 12/2010 | Khanna ................ G06F 11/1482 718/1 |
| 2014/0109089 | A1* | 4/2014 | Zhang ..................... G06F 9/455 718/1 |
| 2014/0201725 | A1* | 7/2014 | Tian .......................... G06F 8/63 717/169 |
| 2015/0331707 | A1* | 11/2015 | Hellkvist .................. G06F 8/63 718/1 |
| 2016/0266892 | A1* | 9/2016 | Sn ............................. G06F 8/68 |

OTHER PUBLICATIONS

Wei, Jinpeng, et al. "Managing security of virtual machine images in a cloud environment." Proceedings of the 2009 ACM workshop on Cloud computing security. ACM, 2009.*
Gareth, Creating an AMI for Classroom Use—System Interrupt Me!, 2014.*

* cited by examiner

Primary Examiner — Charlie Sun
(74) Attorney, Agent, or Firm — Klarquist Sparkman, LLP

(57) ABSTRACT

A virtual machine image service is disclosed in a compute service environment to support management of virtual machine images. The virtual machine image service uses the customer input to generate a new virtual machine image with customization applied. In a simple example, the customer can provide information regarding which virtual machine image requires software updates. In turn, the service can retrieve the virtual machine image, install the updates, reduce the volume of the virtual machine image, run tests to confirm the virtual machine image runs properly, scan the virtual machine image for viruses, and update any desired configuration tools and device drivers. Using customer control features (e.g., a definition file, a script, and/or API parameters), the customer can control what operations are performed on the virtual machine image.

20 Claims, 11 Drawing Sheets

SERVICE FOR MANAGING CUSTOM VIRTUAL MACHINE IMAGES

BACKGROUND

Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

A cloud provider has a plurality of virtual machine images, each of which can be used to instantiate a virtual machine. Additionally, customers of the cloud provider can have custom virtual machine images. Each virtual machine image can have applications and an operating system associated with it that need software updates at regular intervals. When software updates occur, a customer must apply the updates to each custom virtual machine image, which requires a significant investment in time and resources.

DETAILED DESCRIPTION

Figure 1:
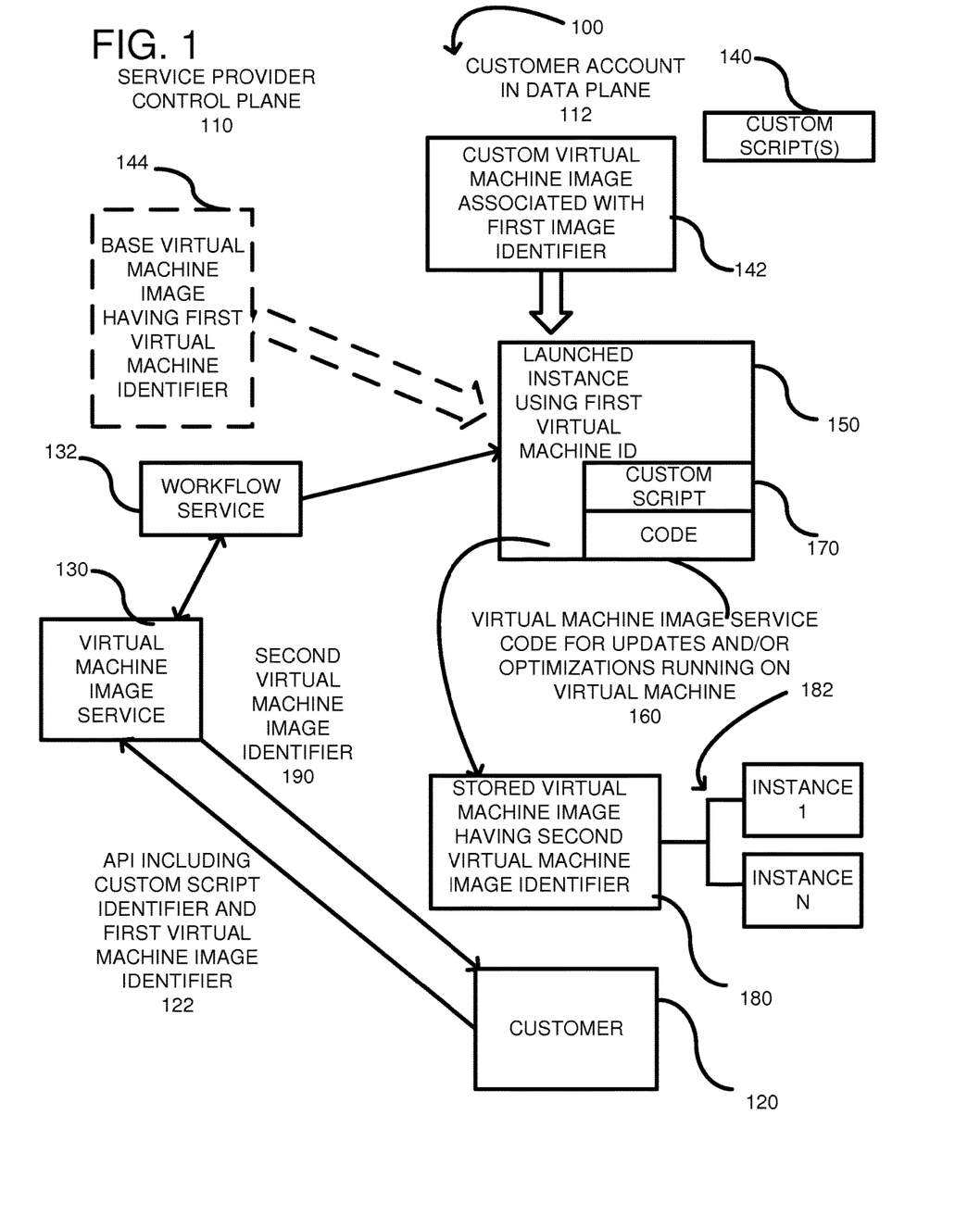
FIG. 1 is an example system diagram showing a service used to manage virtual machine images, wherein an Application Program Interface (API) request from a customer includes a virtual machine identifier that results in generation by the service of a new virtual machine image.
Figure 2:
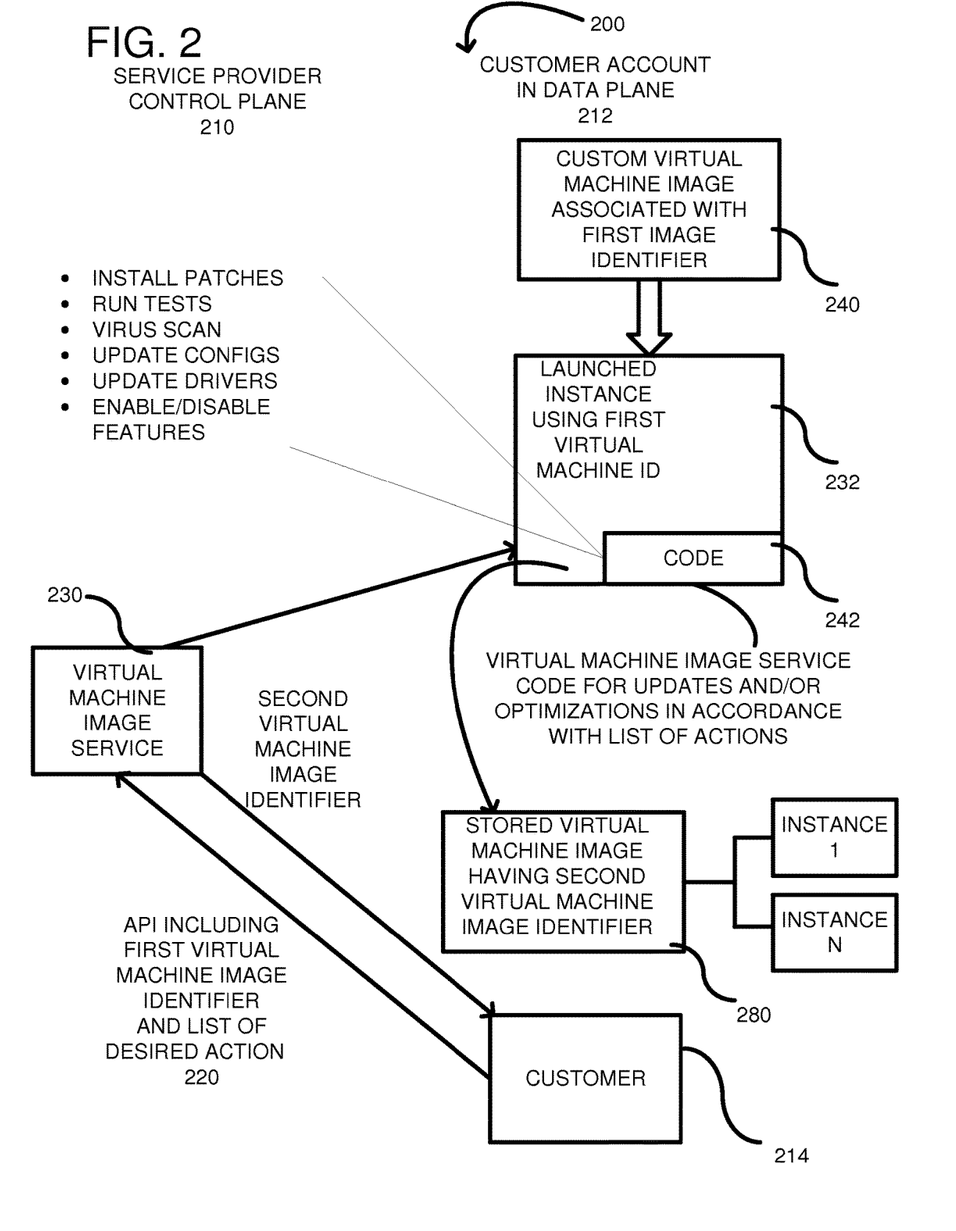
FIG. 2 is another example system diagram showing a service used to manage virtual machine images, wherein an API includes a list of actions to perform when generating a new virtual machine image.
Figure 3:
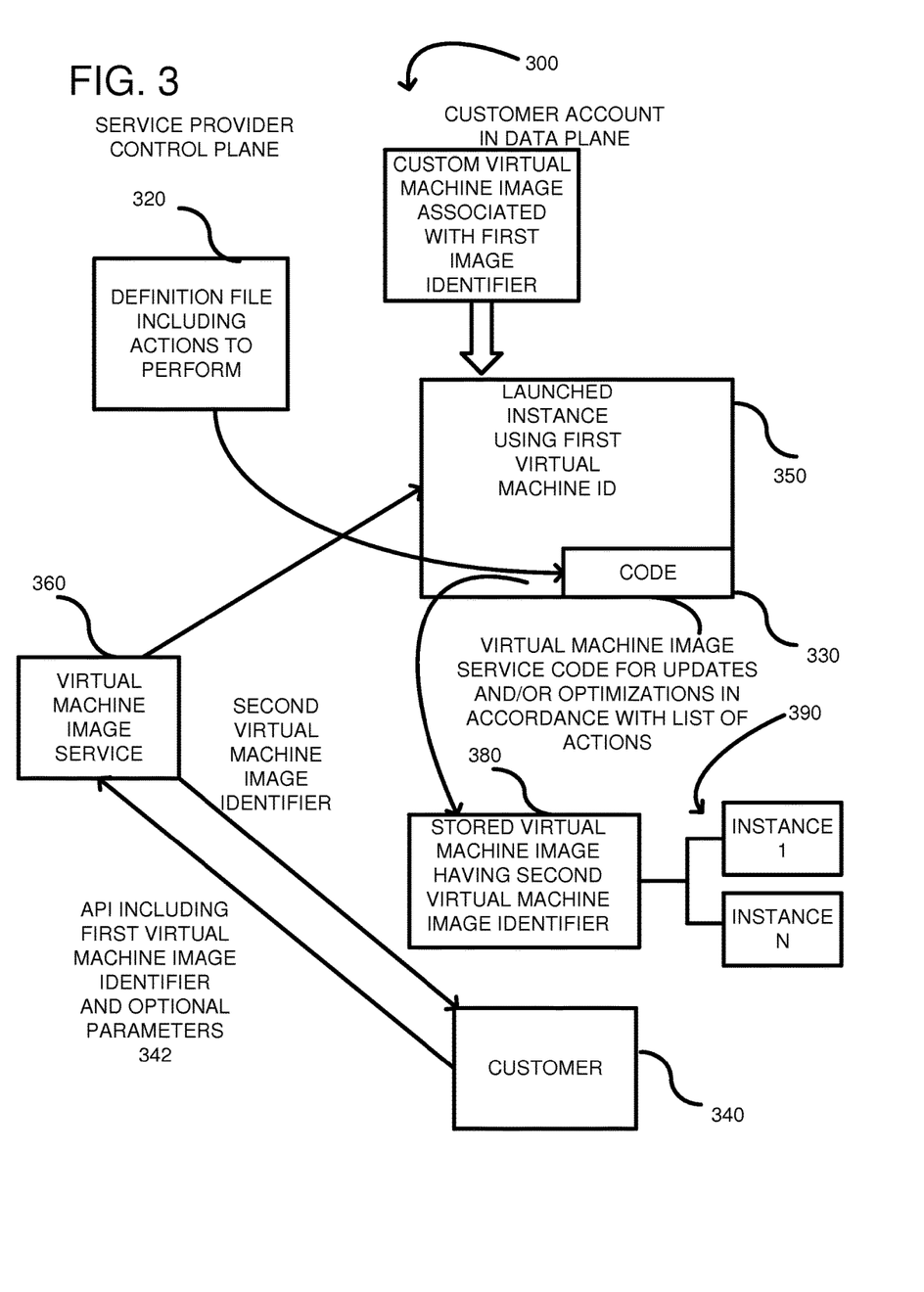
FIG. 3 is still another example system diagram showing a service used to manage virtual machine images, wherein a definition file supplied by the customer is used to control which actions are performed when generating a new virtual machine image.

As shown in FIGS. 1 through 3, there are a variety of embodiments that are described to support management of virtual machine images. A virtual machine image service uses the customer input to generate a new virtual machine image with customization applied. In a simple example, the customer can provide information regarding which virtual machine image requires software updates. In turn, the service can retrieve the virtual machine image, install the updates, reduce the volume of the virtual machine image, run tests to confirm the virtual machine image runs properly, scan the virtual machine image for viruses, and update any desired configuration tools and device drivers. In specific implementations, the service can assume a role of the customer, launch a virtual machine within the customer account, and apply customized operations on the virtual machine. The virtual machine can then be saved as a new virtual machine image with a new identifier and reported back to the customer. Using customer control features (e.g., a definition file, a script, and/or API parameters), the customer can control what operations to perform on the virtual machine. For example, the customer can decide not to execute operations relating to reducing volume. In another example, the customer can decide not to run certain tests on the virtual machine. In still another example, the customer can decide to enable or disable portions of the virtual machine. Other customizations can be performed by the customer. As a result, the service allows kicking off a plurality of patching or customization workflows in parallel with limited or no functional or performance bottlenecks.

FIG. 1 is an example system diagram of a service provider environment 100 divided into at least a control plane 110 and a customer account in a data plane 112. A customer 120 initiates an API request 122, through a console or programmatically, transmitted to a service 130 in the control plane 110. The service, in turn, sends a request to a workflow service 132. The workflow service can receive customer input through APIs, definition files, etc. to control the workflow as described herein. Although shown as separated, the workflow service 132 and the virtual machine image service 130 can be combined into a single logical service running on one or more server computers. The API, in this embodiment, includes a customer script identifier and a first virtual machine identifier, as shown at 122. The custom script identifier is used to point to one or more custom scripts 140 stored in memory in the data plane 112. The custom script identifier can be a unique identifier, such as a Globally Unique Identifier (GUID), that can be used to locate the custom script within the service provider environment 100. The first virtual machine identifier can likewise be a GUID or other identifier used to identify a custom virtual machine image 142. A virtual machine image is a system image used to instantiate a virtual machine. The system image can include an operating system and any additional software that is ready to run on a hypervisor of a host server computer. A customer can customize the virtual machine image 142 by including whatever desired software applications they want to add. Alternatively, a base virtual machine image 144 (shown in dashed as an alternative) can reside in the control plane and provided by the service provider as a configured system image. The custom virtual machine image 142 can be derived from the base virtual machine image 144, but customized to add or delete other software applications.

The service is a virtual machine image service 130 used to manage virtual machine images. In response to the API request, the virtual machine image service 130 can install missing patches and return a new virtual machine image, as one example. Additionally, the service 130 can be used to reduce the volume of a virtual machine image, such as through a defragmenting process, or run tests, scan for viruses, update configuration tools, install device drivers, etc. Still further, the service can be used to execute customer specific scripts in order to further customize the virtual machine image. Accordingly, the service can be used to implement a variety of automated management operations on a virtual machine image so as to allow maintenance of a portfolio of virtual machine images.

The service 130 can also be useful for autoscaling, wherein customers can specify a number of instances to be customized and kept on standby. Additionally, customers can perform scheduled maintenance, such as installing the latest patches, remove old instances incrementally, add new instances, etc. Finally, the service 130 can be a fee-based service for which customers need to pay.

As previously indicated, in response to the API request 122, the service 130 can instruct the workflow service 132 to perform a sequence of operations. For example, the workflow service can assume a role of the customer 120. More specifically, at least some of the permissions and actions that the customer 120 can perform in the customer account 112 can likewise be performed by the service 130 or the workflow service 132. Using such permissions, the workflow service 132 can launch a virtual machine instance 150 using the first virtual machine image identifier provided with the API 122. More specifically, the workflow service 132 uses the identifier to locate the custom virtual machine image 142 and uses that to instantiate the instance 150. After launch, the workflow service 132 can download code 160, which can be interpreted code, such as a script, or executable code, such as an executable file. The code 160 can be used to perform a plurality of operations on the instance 150, such as checking for software updates, installing software updates, rebooting the virtual machine after the updates have been installed, automatically verifying that the virtual machine 150 is fully functional, etc. To verify functionality, the virtual machine 150 can check CPU usage, ensure that applications can be launched, etc.

The virtual machine instance 150 can further download the custom script 140 as shown at 170 and execute the custom script on the instance 150 so that additional operations can be performed on the instance. Using the script, the customer can further customize the instance. Some examples include that the customer can add or remove part of the functionality of the custom virtual machine image 142. Furthermore, the customer can perform desired configurations so as to put the instance in a desired state.

Once the customization from the code 160 and/or script 170 have been performed, the instance 150 can transmit a message back to the workflow service 132 indicating that the operations are complete. The workflow service 132 can then perform additional operations, such as defragmentation, virus scan, etc. The workflow service 132 can then verify that the instance 150 is still operational. Finally, the workflow service 132 can generate a new virtual machine image 180 that has a new virtual machine image identifier. The new virtual machine image 180 represents a customized virtual machine image that can be used to instantiate new instances (1-N, where N is any number), as indicated at 182. After the image 180 is generated and saved, the workflow service 132 can communicate to the service 130 that it is complete. The service 130 can then respond to the API request 122 with a response 190. The response 190 can include the identifier of the new virtual machine image 180, so that the customer can use the image 180 to launch instances 182. The customer can then run the same or different test on one or more of the instances 182 that were launched. Thus, the workflow can be used for test automation, and is not restricted to creating new virtual machine images. It should also be noted that the workflow can be executed manually or triggered by a predefined schedule, such as every month, or based on events or triggers. It should also be noted that any of the above steps can be eliminated from the workflow as controlled by the customer 120. Thus, starting with a virtual machine image, customization can be performed on the image, tests can be executed on the image to create a new image, and then instances can be launched using the new image. The customer can then use the service 130 to run the same or different tests on the instances. In other workflows, the customer can choose to perform the above-described steps, but without executing the tests. Other variations can be performed.

Although FIG. 1 is described as using APIs, other techniques can be used. Web services are commonly used in cloud computing and are associated with APIs. A web service is a software function provided at a network address over the web or the cloud. Clients initiate web service requests to servers and servers process the requests and return appropriate responses. The client web service requests are typically initiated using, for example, an API request. For purposes of simplicity, web service requests will be generally described below as API requests, but it is understood that other web service requests can be made. An API request is a programmatic interface to a defined request-response message system (expressed in JSON or XML), which is exposed via the web. Thus, in certain implementations, an API can be defined as a set of Hypertext Transfer Protocol (HTTP) request messages, together with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a web service receives the API request from a client device, the web service can generate a response to the request and send the response to the endpoint identified in the request.

FIG. 2 shows an alternative embodiment of a service provider environment 200 including a control plane 210 and a data plane 212, similar to FIG. 1. In this embodiment, a customer 214 generates an API 220 that includes a first virtual machine image identifier and a list of actions to be performed. Thus, instead of, or in addition to, a custom script, such as is shown at 140 in FIG. 1, the API includes actions or operations to be performed on an instance so as to customize the instance. The API 220 can be received by a virtual machine image service 230, which uses the first virtual machine image identifier to launch an instance 232 based on a custom virtual image 240 associated with the first image identifier. In this embodiment, a separate workflow service is not shown, but can be considered part of the service 230. Alternatively, the workflow service can be separated out, as described in relation to FIG. 1. The service 230 can verify that the instance 232 launched properly. The service can then initiate execution or interpretation of code 242. The code can use the list of desired actions from the API 220 to select which optimizations or customizations to perform on the launched instance 232. Example optimizations or customizations include installing patches, running tests, performing a virus scan, updating configuration tools and device drivers, enable/disable features, etc. Once the optimizations or customizations are complete, a message can be transmitted from the virtual machine instance 232 to the service 230. In response, the service 230 can generate a new virtual machine 280 that is customized according to the customer's desires. The service can then respond to the request 220 with the new identifier. The list of actions shown in the API 220 can be used to modify the workflow within the service 230.

FIG. 3 shows yet another embodiment of a service provider environment 300. This embodiment is similar to the above embodiments except a definition file 320 (stored in the control plane) can be linked to the customer's account and loaded by code 330. The definition file 320 allows a customer 340 to further customize a launched instance 350 by directing the code 330 which operations to perform on the instance 350. For example, there can be a plurality of candidate operations or actions to potentially perform, but a customer can list which operations or actions are included and which are not. The definition file 320 can be a text file or other desired format. Thus, using the code 330 and the definition file 320, a virtual machine service 360 can generate a new virtual machine image 380. The virtual machine image 380 can then be used as a base to generate a plurality of virtual machine instances 390. In this embodiment, the API 342 is shown having the first virtual machine image identifier plus other optional parameters that can be used by the definition file 320 to perform further customization.

Figure 4:
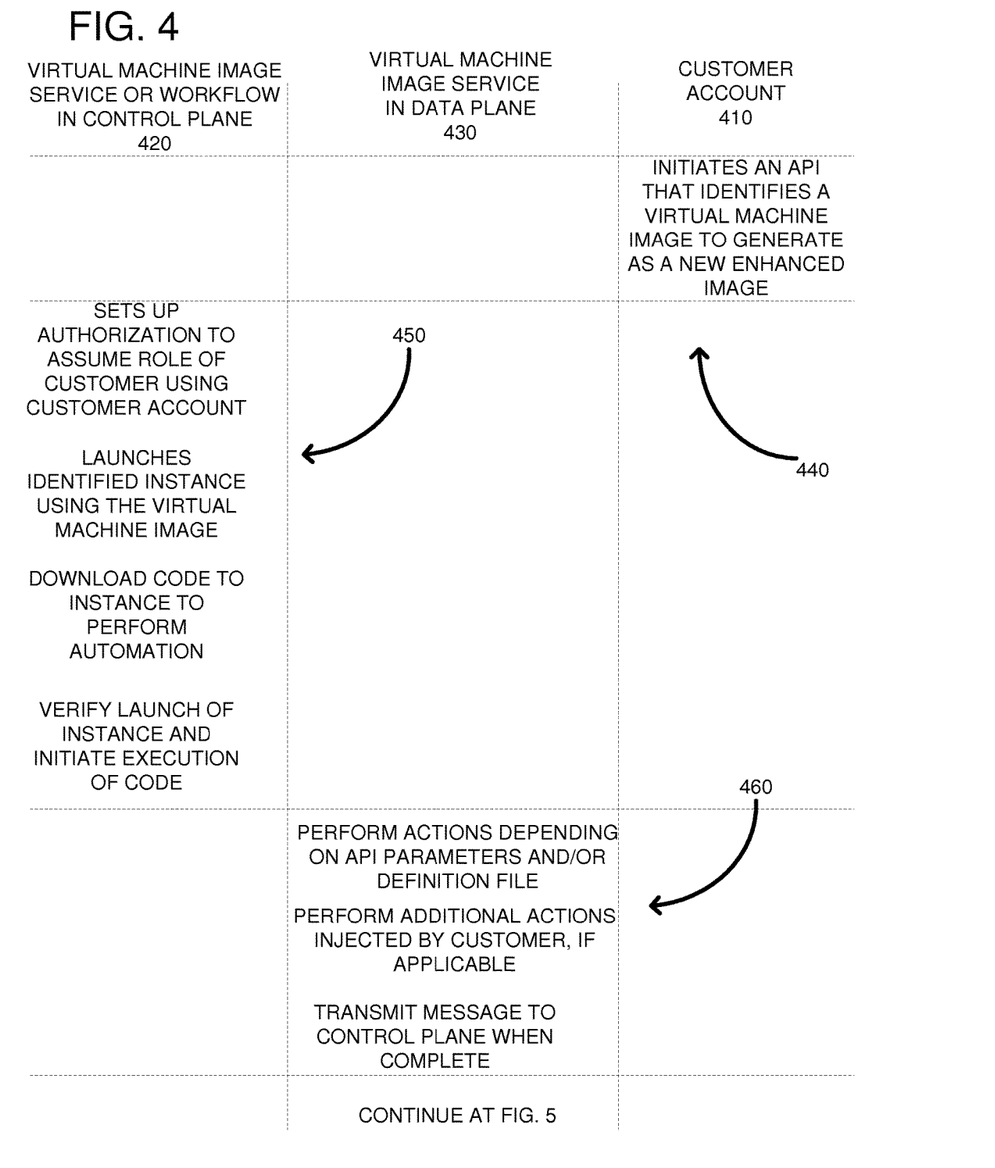
FIGS. 4 and 5 illustrate a flow of operations performed by a service in a control plane, performed by the service in the data plane, and performed by a customer for managing a virtual machine image.
Figure 5:
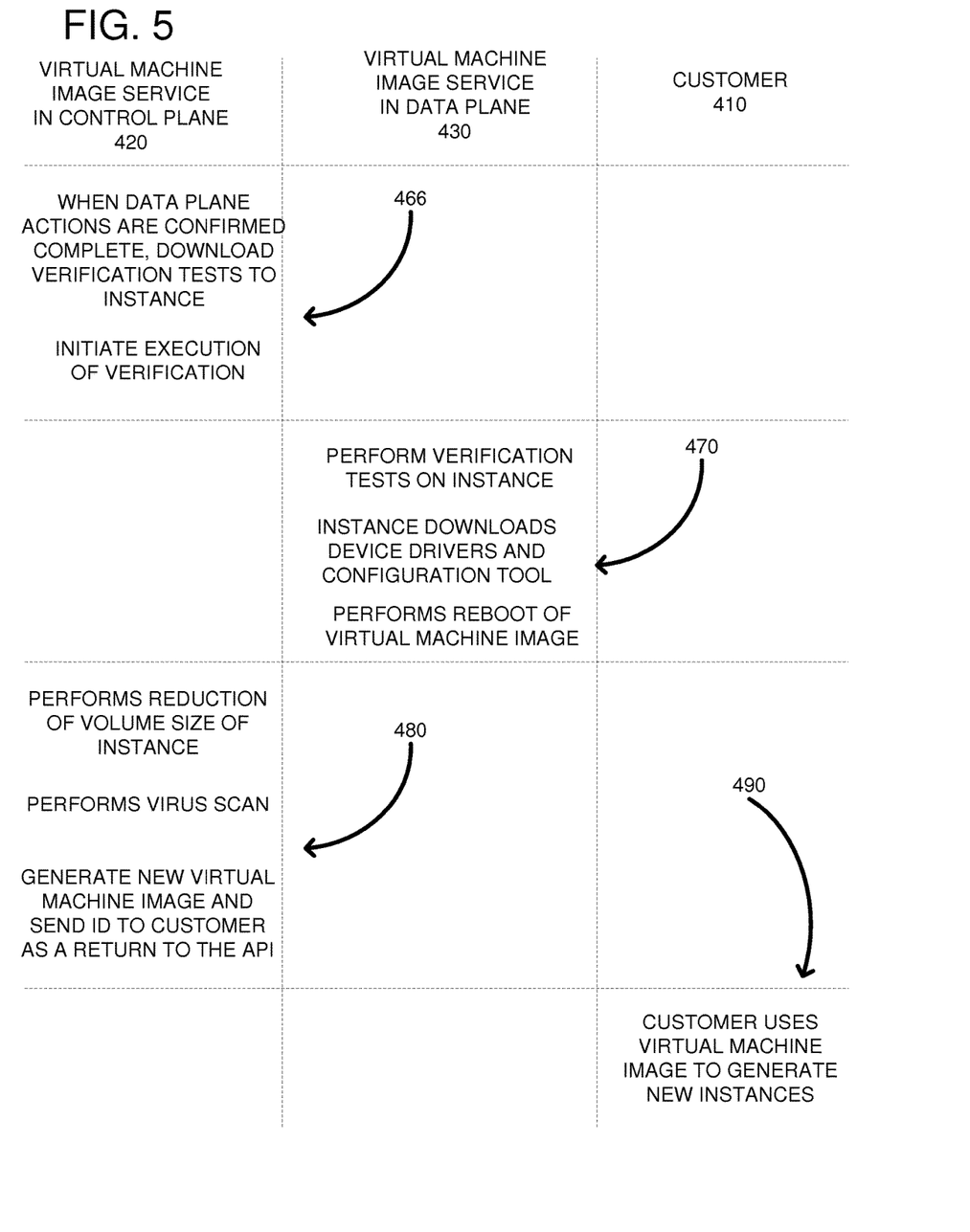

FIGS. 4 and 5 illustrate an example showing interactions between a customer account 410 and the virtual machine image service (or workflow service) that operates in both a control plane 420 and a data plane 430. In this embodiment, the workflow service is considered part of the virtual machine service, although any of the operations described herein can be performed by the workflow service. It should also be understood that the following flow can be performed in any desired order and some of the steps can be eliminated or others added. In the control plane 420, the service acts as a management tool that can be subscribed to by customers in a service provider environment to manage virtual machine images. In the data plane, the service assumes a role of the customer to launch an instance within the customer account, performs customized operations on the instance, and then saves the instance as a new virtual machine image.

The process can be initiated by the customer as shown at 440. Typically, the customer initiates an API through one of a variety of techniques. For example, in a user interface, a customer administrator can select a virtual machine image to customize and select desired customization operations to be performed. In response, an API request can be automatically generated and sent to the virtual machine image service in the control plane 420. The API request can include an identifier to the selected virtual machine image. As shown at 450, in response to receiving the request, the service can set up authorization to assume a role of the customer using the customer account. Such authorization can be controlled through the service provider environment. Subsequently, the service can use the identifier of the selected virtual machine image to launch a virtual machine in the customer account 410. Next, the service can download code to the instance so as to perform customizations. This allows the service to perform customizations inside the data plane and outside the data plane (in the control plane). Thus, the instance itself can perform customizations as can the service acting upon the instance. A back-and-forth between operations or commands performed inside the instance and outside the instance allow a variety of customization options to be performed. The downloaded code can include service-based code and a custom script provided by the user. Typically, the service-based code executes first and detects that a custom script is available. The service-based code can then obtain and execute or interpret the customer script. In this way, the customer can inject customization operations into the virtual machine instance. Continuing at 450, the service in the control plane 420 can verify that the instance launched properly. Finally, the service can initiate execution of the downloaded code.

As shown at 460, the downloaded code within the virtual machine instance can then take over control of implementing the customizations. For example, the virtual machine instance can perform actions based upon API parameters received in the original request, a definition file, a script, or a combination thereof. The customer can thereby choose one or more of the following based on the customization options: 1) check for patches; 2) install patches; 3) run tests; 4) scan for viruses; 5) update configuration tools; and/or 6) update device drivers. Other customization options can also be included. When the virtual machine instance has completed its customizations, it can transmit a message to the control plane. The flow continues in FIG. 5.

FIG. 5 shows at 466 that upon receiving the message from the data plane, the service can download further verification tests to the instance and initiate the verification tests. The instance in the data plane 430 can then resume control at 470 and perform the verification tests to ensure that the instance is executing properly, such as after the patches have been installed. The verifications can include determining whether applications can be properly launched on the instance, whether the CPU has normal load, whether basic graphical user interface features are functioning, etc. The instance can then download device drivers, configuration tools, and any other desired software. Once the instance has finished the verification and any additional installations, it can reboot itself, if needed, based on the operating system. At 480, the service can take control of the customization and perform a reduction in volume, a virus scan and generate a new virtual machine image. Generating the new virtual machine image includes using the virtual machine that was customized to create a virtual machine image that is usable as a preconfigured virtual machine image (i.e., a virtual appliance) ready for launching other virtual machines. The new virtual machine image has an associated identifier that is sent back to the customer in response to the original API request. As shown at 490, a customer can use the virtual machine image to generate new virtual machine instances. After the new virtual machine instances are generated, further verification tests can be performed on those instances from within the instances and/or outside of the instances using the service.

Figure 6:
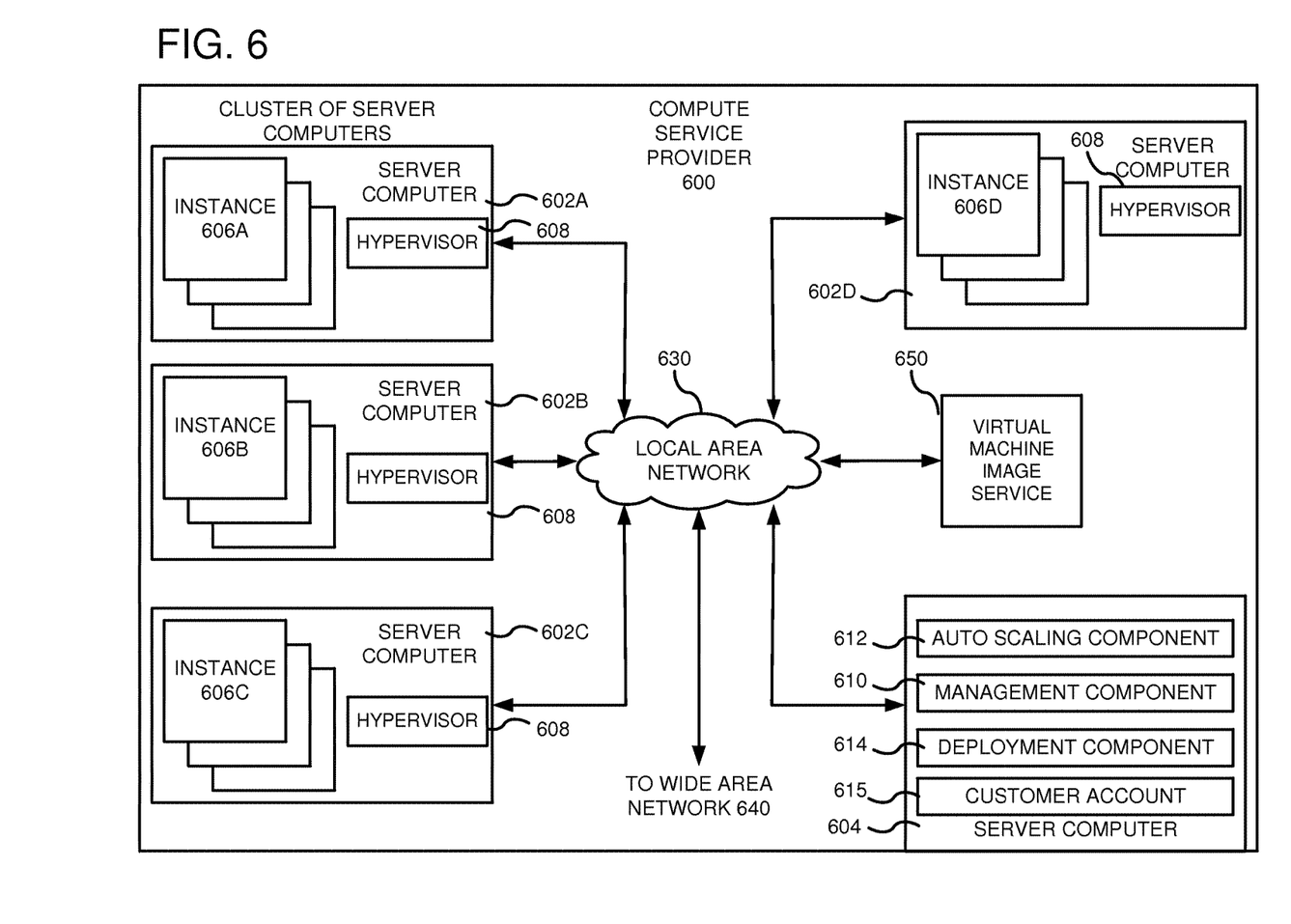
FIG. 6 is an example system diagram showing a plurality of virtual machine instances running in a multi-tenant environment with a virtual machine image service executing therein.

FIG. 6 is a computing system diagram of a network-based compute service provider 600 that illustrates one environment in which embodiments described herein can be used. By way of background, the compute service provider 600 (i.e., the cloud provider) is capable of delivery of computing and storage capacity as a service to a community of end recipients. In an example embodiment, the compute service provider can be established for an organization by or on behalf of the organization. That is, the compute service provider 600 may offer a "private cloud environment." In another embodiment, the compute service provider 600 supports a multi-tenant environment, wherein a plurality of customers operate independently (i.e., a public cloud environment). Generally speaking, the compute service provider 600 can provide the following models: Infrastructure as a Service ("IaaS"), Platform as a Service ("PaaS"), and/or Software as a Service ("SaaS"). Other models can be provided. For the IaaS model, the compute service provider 600 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 600 using networked client devices, such as desktop computers, laptops, tablets, smartphones, etc. running web browsers or other lightweight client applications. Those skilled in the art will recognize that the compute service provider 600 can be described as a "cloud" environment.

The particular illustrated compute service provider 600 includes a plurality of server computers 602A-602D. While only four server computers are shown, any number can be used, and large centers can include thousands of server computers. The server computers 602A-602D can provide computing resources for executing software instances 606A-606D. In one embodiment, the instances 606A-606D are virtual machines. As known in the art, a virtual machine is an instance of a software implementation of a machine (i.e. a computer) that executes applications like a physical machine. In the example of virtual machine, each of the servers 602A-602D can be configured to execute a hypervisor 608 or another type of program configured to enable the execution of multiple instances 606 on a single server. Additionally, each of the instances 606 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 604 can be reserved for executing software components for managing the operation of the server computers 602 and the instances 606. For example, the server computer 604 can execute a management component 610. A customer can access the management component 610 to configure various aspects of the operation of the instances 606 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 612 can scale the instances 606 based upon rules defined by the customer. In one embodiment, the auto scaling component 612 allows a customer to specify scale-up rules for use in determining when new instances should be instantiated and scale-down rules for use in determining when existing instances should be terminated. The auto scaling component 612 can consist of a number of subcomponents executing on different server computers 602 or other computing devices. The auto scaling component 612 can monitor available computing resources over an internal management network and modify resources available based on need.

A deployment component 614 can be used to assist customers in the deployment of new instances 606 of computing resources. The deployment component can have access to account information associated with the instances, such as who is the owner of the account, credit card information, country of the owner, etc. The deployment component 614 can receive a configuration from a customer that includes data describing how new instances 606 should be configured. For example, the configuration can specify one or more applications to be installed in new instances 606, provide scripts and/or other types of code to be executed for configuring new instances 606, provide cache logic specifying how an application cache should be prepared, and other types of information. The deployment component 614 can utilize the customer-provided configuration and cache logic to configure, prime, and launch new instances 606. The configuration, cache logic, and other information may be specified by a customer using the management component 610 or by providing this information directly to the deployment component 614. The instance manager can be considered part of the deployment component.

Customer account information 615 can include any desired information associated with a customer of the multi-tenant environment. For example, the customer account information can include a unique identifier for a customer, a customer address, billing information, licensing information, customization parameters for launching instances, scheduling information, autoscaling parameters, previous IP addresses used to access the account, etc. The customer account information can also include a pointer to a custom script 140 or the definition file 320 to allow customization of virtual machine images, as previously described.

A network 630 can be utilized to interconnect the server computers 602A-602D and the server computer 604. The network 630 can be a local area network (LAN) and can be connected to a Wide Area Network (WAN) 640 so that end users can access the compute service provider 600. It should be appreciated that the network topology illustrated in FIG. 6 has been simplified and that many more networks and networking devices can be utilized to interconnect the various computing systems disclosed herein.

A virtual machine image service 650 is shown coupled to the network 630 and can be used to customize virtual machines running on the hypervisors 608, as further described below. The virtual machine image service 650 is a management tool within the compute service provider 600 that can be a paid-for service by customers of the compute service provider.

Figure 7:
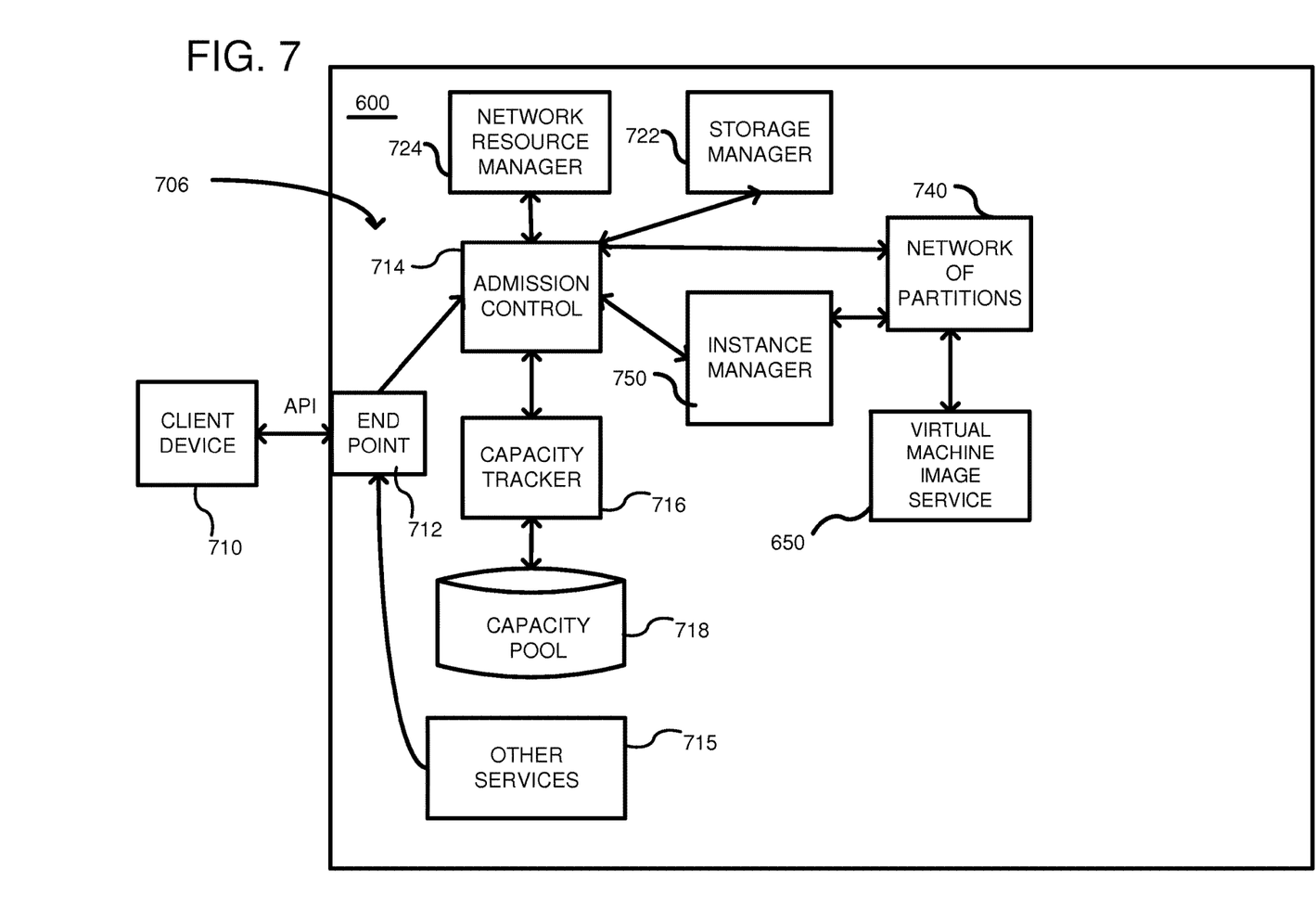
FIG. 7 shows further details of an example system including a plurality of management components associated with a control plane.

FIG. 7 illustrates in further detail management components 706 that can be used in the multi-tenant environment of the compute service provider 600. In order to access and utilize instances (such as instances 606 of FIG. 6), a client device can be used. The client device 710 can be any of a variety of computing devices, mobile or otherwise including a cell phone, smartphone, handheld computer, Personal Digital Assistant (PDA), desktop computer, etc. The client device 710 can communicate with the compute service provider 600 through an end point 712, which can be a DNS address designed to receive and process API requests. In particular, the end point 712 can be a web server configured to expose an API. Using the API requests, a client 710 can make requests to implement any of the functionality described herein. Other services 715, which can be internal to the compute service provider 600, can likewise make API requests to the end point 712.

Other general management services that may or may not be included in the compute service provider 600 include an admission control 714, e.g., one or more computers operating together as an admission control web service. The admission control 714 can authenticate, validate and unpack the API requests for service or storage of data within the compute service provider 600. The capacity tracker 716 is responsible for determining how the servers need to be configured in order to meet the need for the different instance types by managing and configuring physical inventory in terms of forecasting, provisioning and real-time configuration and allocation of capacity. The capacity tracker 716 maintains a pool of available inventory in a capacity pool database 718. The capacity tracker 716 can also monitor capacity levels so as to know whether resources are readily available or limited. An instance manager 750 controls launching and termination of instances in the network. When an instruction is received (such as through an API request) to launch an instance, the instance manager pulls resources from the capacity pool 718 and launches the instance on a decided upon host server computer. Similar to the instance manager are the storage manager 722 and the network resource manager 724. The storage manager 722 relates to initiation and termination of storage volumes, while the network resource manager 724 relates to initiation and termination of routers, switches, subnets, etc. A network of partitions 740 is described further in relation to FIG. 8 and includes a physical layer upon which the instances are launched.

The virtual machine image service 650 is shown coupled to the network of partitions 740 and can use the services of the compute service provider 600 in order to be able to assume the role of the customer and to launch an instance on the customer account.

Figure 8:
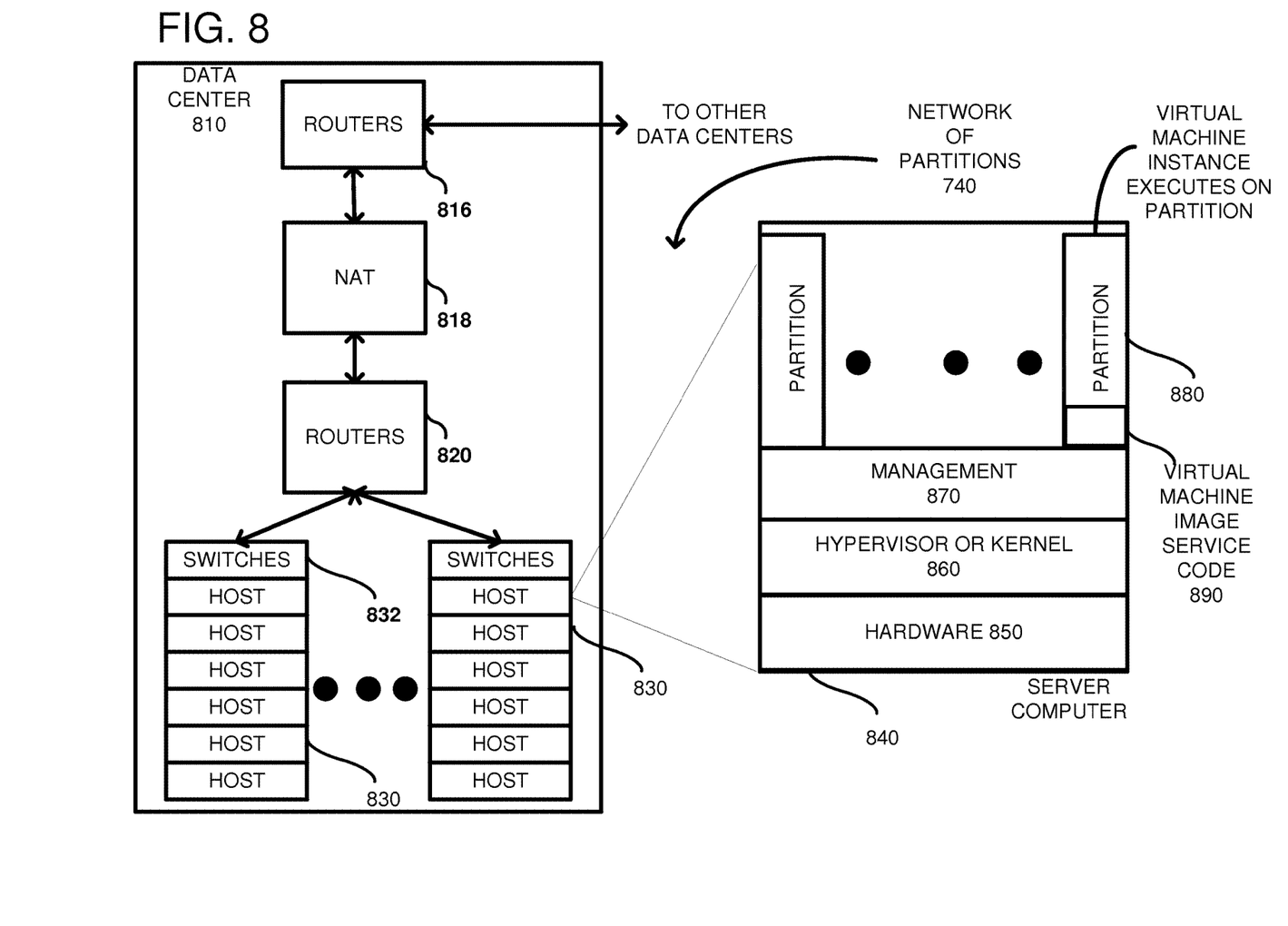
FIG. 8 shows an example of a plurality of host computers, routers and switches, which are hardware assets used for running virtual machine instances in a data plane.

FIG. 8 illustrates the network of partitions 740 and the physical hardware associated therewith. The network of partitions 740 can include a plurality of data centers, such as data center 810, coupled together by routers 816. The routers 816 read address information in a received packet and determine the packet's destination. If the router decides that a different data center contains a host server computer, then the packet is forwarded to that data center. If the packet is addressed to a host in the data center 810, then it is passed to a network address translator (NAT) 818 that converts the packet's public IP address to a private IP address. The NAT also translates private addresses to public addresses that are bound outside of the datacenter 810. Additional routers 820 can be coupled to the NAT to route packets to one or more racks of host server computers 830. Each rack 830 can include a switch 832 coupled to multiple host server computers. A particular host server computer is shown in an expanded view at 840.

Each host 840 has underlying hardware 850 including one or more CPUs, memory, storage devices, etc. Running a layer above the hardware 850 is a hypervisor or kernel layer 860. The hypervisor or kernel layer can be classified as a type 1 or type 2 hypervisor. A type 1 hypervisor runs directly on the host hardware 850 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 870 can be part of the hypervisor or separated therefrom and generally includes device drivers needed for accessing the hardware 850. The partitions 880 are logical units of isolation by the hypervisor. Each partition 880 can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions. Code downloaded from the virtual machine image service 650 is shown at 890 executing on the partition 880. The code 890 can be used to customize the virtual machine as previously described.

Figure 9:
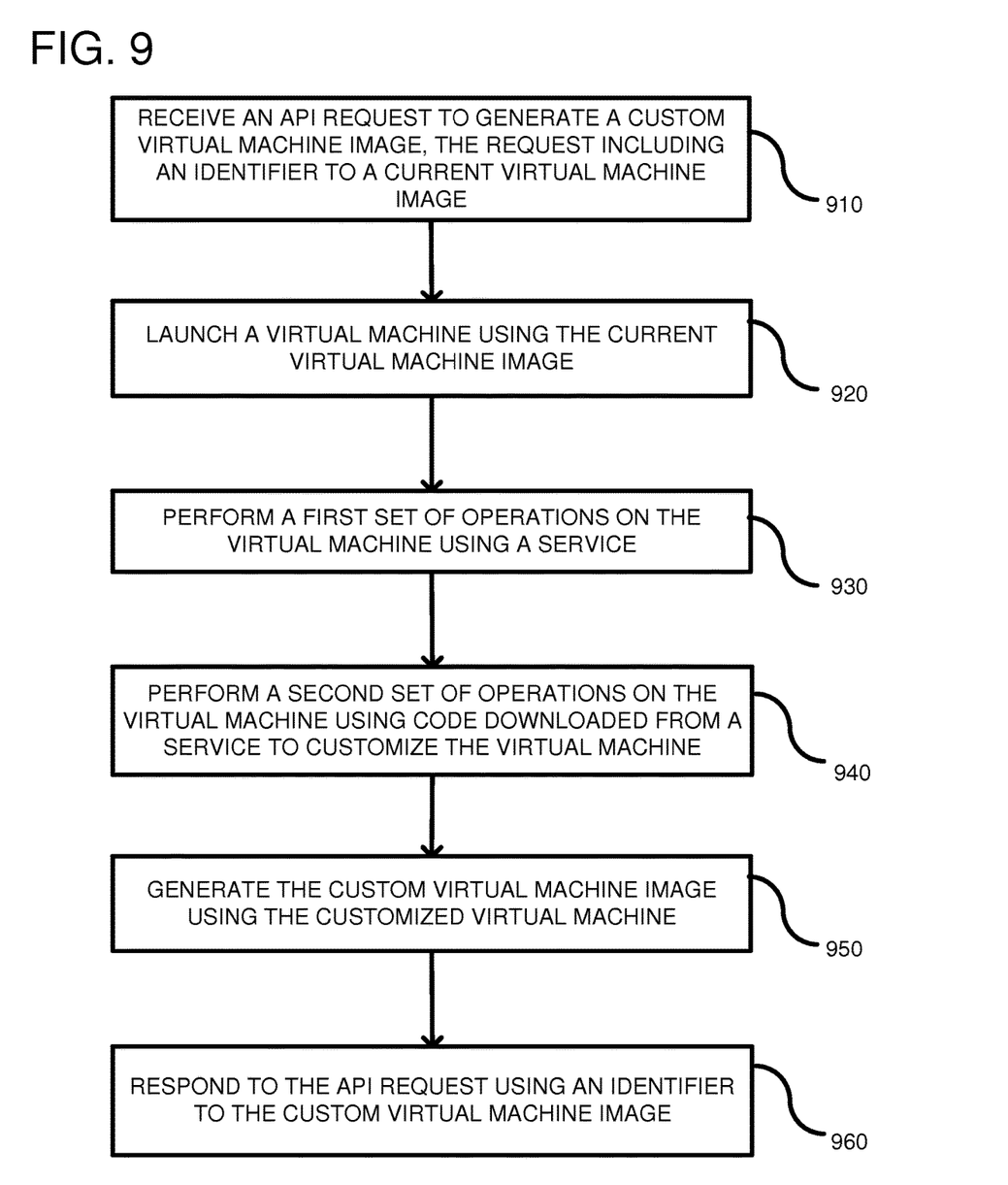
FIG. 9 is a flowchart of a method according to one embodiment for managing a custom virtual machine image.

FIG. 9 is a flowchart according to a first embodiment for managing a virtual machine image for a customer of a service provider. In process block 910, an API request is received to generate a custom virtual machine image. The request can include an identifier to a current virtual machine image. As described in relation to FIG. 1, the identifier can point to a base virtual machine image 144 provided by the service provider or it can point to a custom virtual machine image 142 within the data plane and associated with the customer account. In process block 920, a virtual machine can be launched using the identifier. As a result, the current virtual machine image is used as a template and the launched virtual machine is derived from the current virtual machine image. In process block 930, a first set of operations are performed on the virtual machine using a virtual machine image service, such as the service 130 shown operating in the control plane of FIG. 1. The first set of operations can include any or all of the operations shown at 450 in FIG. 4. Other operations can also be included. In process block 940, a second set of operations on the virtual machine can be performed using code downloaded from the service to the virtual machine. The downloaded code can check for patches, install patches (a software update on applications or an operating system), run tests, scan for viruses, reboot the virtual machine, etc. Thus, control of the customization is passed between the service and the virtual machine for performing the entire customization. In process block 950, a custom virtual machine image can be generated using the custom virtual machine. Thus, the service can use the custom virtual machine to generate the image (a template for a root volume of an instance, such as an operating system, an application server, and applications). The virtual machine image that is generated has a new identifier associated therewith. In process block 960, a response to the API request can be made using the identifier to the custom virtual machine image. Thus, a customer can request a plurality of operations to be performed on an existing virtual machine image and, in return, receive an identifier to a new image that is derived from the existing virtual machine image, but with the operations performed thereon.

Figure 10:
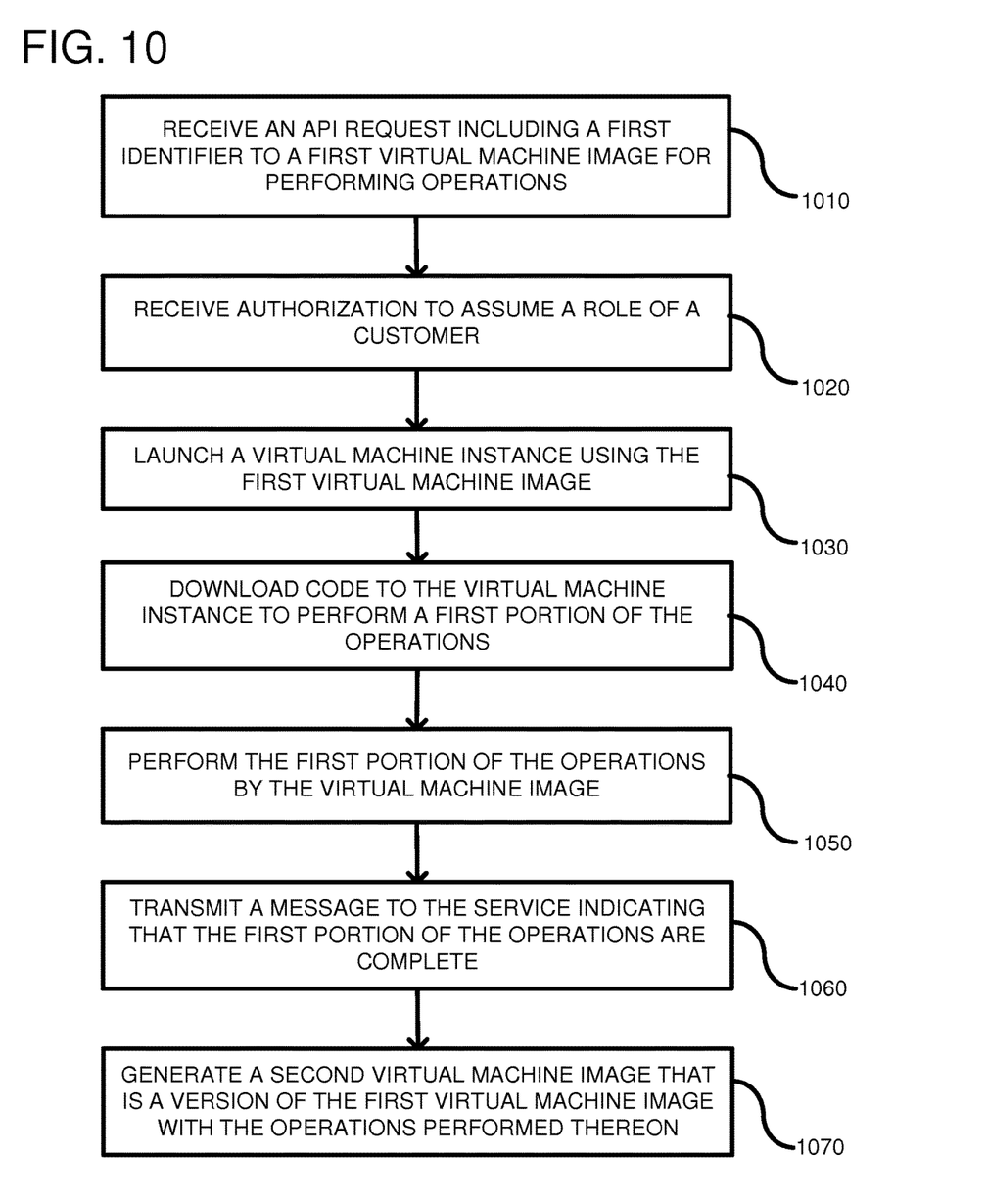
FIG. 10 is a flowchart of a method according to another embodiment for managing a custom virtual machine image.

FIG. 10 shows a flowchart of another embodiment that can be used to manage virtual machine images. In process block 1010, an API request including a first identifier is received, wherein the first identifier identifies a virtual machine image and the request is to customize a virtual machine image by performing customization operations thereon. The request is received from a customer from within a service provider or outside of the service provider. In process block 1020, the service assumes the role of the customer through receiving authorization from the compute service provider. By assuming the role of the customer, the service receives permissions so that it can access resources within the compute service provider just as if it was the customer. In switching permissions, the service can lose permissions that it had in favor of the customer permissions. In process block 1030, a virtual machine instance can be launched within the customer account by the service. The virtual machine instance is launched within a data plane of the compute service provider. The service uses the identifier received in process block 1010 to retrieve virtual machine image used as a template for the virtual machine instance. In process block 1040, the service can download code to the virtual machine instance to perform a first portion of the customization operations. The code can be a script or compiled code depending on the implementation. A second portion of the customization operations can be performed by the service so that both the virtual machine (on a first host server computer) and the service (on a second host server computer) both cooperate to customize the virtual machine. In process block 1050, the host server computer executing the virtual machine performs the first portion of the operations. Which operations are performed can be based upon selections made by the customer, such as through a definition file, API parameters, or other means. In process block 1060, a message (e.g., an API) is transmitted from the virtual machine to the service indicating that the first portion of the operations are complete. In process block 1070, the service can generate a second virtual machine image that is a customized version of the first virtual machine image with the operations performed thereon. The second virtual machine image can have an identifier associated therewith that is different from the identifier of the first virtual machine image. The second virtual machine image is derived from the first virtual machine image but with customizations applied (e.g., tests run, updates applied, new applications loaded, features enabled/disabled, etc.)

Figure 11:
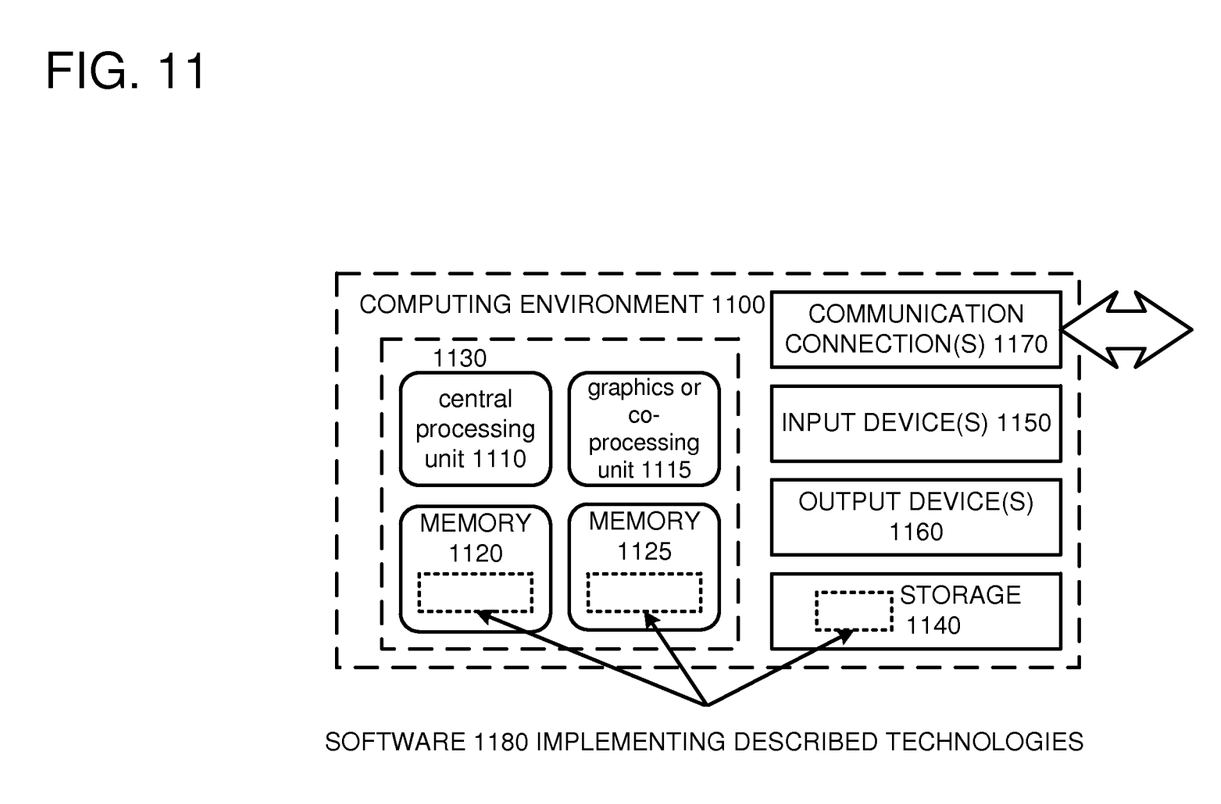
FIG. 11 depicts a generalized example of a suitable computing environment in which the described innovations may be implemented.

FIG. 11 depicts a generalized example of a suitable computing environment 1100 in which the described innovations may be implemented. The computing environment 1100 is not intended to suggest any limitation as to scope of use or functionality, as the innovations may be implemented in diverse general-purpose or special-purpose computing systems. For example, the computing environment 1100 can be any of a variety of computing devices (e.g., desktop computer, laptop computer, server computer, tablet computer, etc.)

With reference to FIG. 11, the computing environment 1100 includes one or more processing units 1110, 1115 and memory 1120, 1125. In FIG. 11, this basic configuration 1130 is included within a dashed line. The processing units 1110, 1115 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s). The memory 1120, 1125 stores software 1180 implementing one or more innovations described herein, in the form of computer-executable instructions suitable for execution by the processing unit(s).

A computing system may have additional features. For example, the computing environment 1100 includes storage 1140, one or more input devices 1150, one or more output devices 1160, and one or more communication connections 1170. An interconnection mechanism (not shown) such as a bus, controller, or network interconnects the components of the computing environment 1100. Typically, operating system software (not shown) provides an operating environment for other software executing in the computing environment 1100, and coordinates activities of the components of the computing environment 1100.

The tangible storage 1140 may be removable or non-removable, and includes magnetic disks, magnetic tapes or cassettes, CD-ROMs, DVDs, or any other medium which can be used to store information in a non-transitory way and which can be accessed within the computing environment 1100. The storage 1140 stores instructions for the software 1180 implementing one or more innovations described herein.

The input device(s) 1150 may be a touch input device such as a keyboard, mouse, pen, or trackball, a voice input device, a scanning device, or another device that provides input to the computing environment 1100. The output device(s) 1160 may be a display, printer, speaker, CD-writer, or another device that provides output from the computing environment 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of managing a custom virtual machine image for a customer of a service provider, the method comprising:
   receiving an Application Program Interface (API) request associated with a customer account, the API request being received in a service residing in a control plane of the service provider, the API request including a first identifier to a first virtual machine image for performing operations on the first virtual machine image;
   receiving authorization by the service to assume a role of the customer; launching, by the service, a virtual machine instance using the first virtual machine image within the customer account in a data plane of the service provider;
   downloading code, by the service, to the virtual machine instance to perform at least a first portion of the operations;
   performing the first portion of the operations by the virtual machine instance;
   transmitting a message from the virtual machine instance to the service indicating that the first portion of the operations are complete; and
   generating, by the service, a second virtual machine image that is a version of the first virtual machine image having the operations performed thereon.

2. The method of claim 1, wherein the operations include performing a software update to an application or an operating system associated with the first virtual machine image.

3. The method of claim 1, wherein the operations include executing a customer provided script.

4. The method of claim 1, wherein the operations include the first portion of the operations performed by the virtual machine instance in the data plane, and a second portion of the operations performed by the service so as to customize the second virtual machine image.

5. The method of claim 1, further including reading a definition file by the code, the definition file identifying which of the operations to perform amongst a plurality of candidate operations.

6. A computer-readable storage medium including instructions that upon execution cause a computer system to:
   in a service of a service provider, receive a request to generate a custom virtual machine image, the request including a first identifier to a current virtual machine image;
   use the first identifier to launch, on a host server computer, a virtual machine using the current virtual machine image;
   perform a first set of operations on the virtual machine using the service outside of the virtual machine;
   perform a second set of operations on the virtual machine using code downloaded from the service and executed by the virtual machine to customize the virtual machine;
   generate the custom virtual machine image having a second identifier using the virtual machine which was customized; and
   respond to the request using the second identifier so as to deliver the custom virtual machine image.

7. The computer-readable storage medium according to claim 6, wherein the instructions, upon execution, further cause the computer system to: assume a role of a requestor that made the request within the service provider so as to launch the virtual machine.

8. The computer-readable storage medium according to claim 6, wherein the requestor is a customer of the service provider and the custom virtual machine image is stored in an account of the customer.

9. The computer-readable storage medium according to claim 6, wherein the instructions, upon execution, further cause the computer system to:
   perform a third set of operations on the virtual machine using the code downloaded from the requestor to generate the customized virtual machine.

10. The computer-readable storage medium according to claim 6, wherein the first set of operations perform a software update to an application or an operating system associated with the virtual machine.

11. The computer-readable storage medium according to claim 6, wherein the instructions, upon execution, further cause the computer system to: instantiate multiple virtual machines on multiple host server computers within the service provider using the custom virtual machine image.

12. The computer-readable storage medium according to claim 6, wherein the service is positioned within a control plane of the service provider and the virtual machine is within a data plane of the service provider, and the generation of the custom virtual image is a result of passing control of the operations to be performed between the control plane and the data plane.

13. The computer-readable storage medium according to claim 6, wherein the performing of the first set of operations includes performing a virus scan of the virtual machine and/or performing a reduction of a volume size of the virtual machine.

14. The computer-readable storage medium according to claim 6, wherein the performing of the second set of operations includes checking for any software updates and installing the software updates if the software updates are available.

15. A service provider, comprising:
   a plurality of host server computers associated with a data plane of the service provider for executing virtual machines; and
   a service within the service provider executing on one or more host server computers in a control plane of the service provider;
   the service for receiving a request including a virtual machine image identifier of a virtual machine image and a custom script identifier used to locate a custom script stored in memory within the data plane and for automatically launching a virtual machine using the virtual machine image on one of the plurality of host server computers associated with the data plane and for downloading the custom script onto the virtual machine to customize the virtual machine in accordance with the request, the service further for generating a custom virtual machine image based on the customized virtual machine and returning a custom virtual machine image identifier of the custom virtual machine image in response to the request, wherein the custom virtual machine image is configured to launch multiple new instances of the virtual machine.

16. The service provider of claim 15, further including storage coupled to the plurality of host server computers, the storage for storing a definition file describing actions to perform by the executable code to customize the virtual machine.

17. The service provider of claim 15, wherein the code is used to perform software updates to an operating system of the virtual machine.

18. The service provider of claim 15, wherein the custom virtual machine image is configured to instantiate multiple virtual machines on the plurality of host server computers.

19. The service provider of claim 15, wherein the service assumes a role of a customer to launch the virtual machine in the data plane.

20. The service provider of claim 15, further including storage for storing a customer script to be executed on the virtual machine to further customize the virtual machine.

* * * * *